United States Patent
Harris et al.

(10) Patent No.: US 11,742,536 B2
(45) Date of Patent: *Aug. 29, 2023

(54) VEHICLE ENERGY-STORAGE SYSTEMS HAVING PARALLEL COOLING

(71) Applicant: Faraday & Future Inc., Gardena, CA (US)

(72) Inventors: W. Porter Harris, Los Angeles, CA (US); Blake Robert Rosengren, Hermosa Beach, CA (US); Nicholas John Sampson, Rancho Palos Verdes, CA (US); Travis David Cournoyer, Hermosa Beach, CA (US); Phillip John Weicker, Los Angeles, CA (US)

(73) Assignee: Faraday & Future Inc., Gardena, CA (US)

( * ) Notice: Subject to any disclaimer, the term of this patent is extended or adjusted under 35 U.S.C. 154(b) by 675 days.

This patent is subject to a terminal disclaimer.

(21) Appl. No.: 15/836,720

(22) Filed: Dec. 8, 2017

(65) Prior Publication Data

US 2018/0358667 A1 Dec. 13, 2018

Related U.S. Application Data

(63) Continuation-in-part of application No. 14/868,234, filed on Sep. 28, 2015, which is a continuation of
(Continued)

(51) Int. Cl.
*H01M 10/625* (2014.01)
*H01M 10/6552* (2014.01)
(Continued)

(52) U.S. Cl.
CPC ........... *H01M 10/625* (2015.04); *B60L 50/64* (2019.02); *H01M 10/0525* (2013.01);
(Continued)

(58) Field of Classification Search
CPC ........... H01M 10/0525; H01M 10/613; H01M 10/625; H01M 10/6552; H01M 10/6557;
(Continued)

(56) References Cited

U.S. PATENT DOCUMENTS

| | | | | |
|---|---|---|---|---|
| 2003/0082439 A1* | 5/2003 | Sakakibara | ......... | H01M 2/0202 429/120 |
| 2009/0274952 A1* | 11/2009 | Wood | ...................... | B60L 50/64 429/99 |

(Continued)

*Primary Examiner* — Lingwen R Zeng
(74) *Attorney, Agent, or Firm* — Veros Legal Solutions, LLP

(57) ABSTRACT

Provided are systems for vehicle energy storage having parallel cooling comprising a plurality of modules. Each module may comprise two half modules coupled together. Each half module can include a plurality of battery cells. A current carrier of each half module may be electrically coupled to the cells. The cells may be disposed between the current carrier and a plate. Each half module can have the cells, current carrier, and blast plate disposed in an enclosure. The enclosure can have a coolant sub-system for circulating coolant in parallel to the plurality of cells such that each of the battery cells is at approximately the same predetermined temperature. The modules may be disposed in a tray. A coolant system may be provided for circulating coolant across the plurality of modules in parallel such that each of the modules can be maintained at approximately the same predetermined temperature.

10 Claims, 13 Drawing Sheets

Related U.S. Application Data application No. 14/841,617, filed on Aug. 31, 2015, now abandoned.

(60) Provisional application No. 62/186,977, filed on Jun. 30, 2015.

(51) Int. Cl.
| | |
|---|---|
| *H01M 10/0525* | (2010.01) |
| *H01M 10/6557* | (2014.01) |
| *H01M 10/613* | (2014.01) |
| *H01M 10/6567* | (2014.01) |
| *H01M 50/249* | (2021.01) |
| *H01M 50/24* | (2021.01) |
| *H01M 50/242* | (2021.01) |
| *B60L 50/64* | (2019.01) |
| *H01M 50/516* | (2021.01) |
| *H01M 50/507* | (2021.01) |

(52) U.S. Cl.
CPC ..... *H01M 10/613* (2015.04); *H01M 10/6552* (2015.04); *H01M 10/6557* (2015.04); *H01M 10/6567* (2015.04); *H01M 50/24* (2021.01); *H01M 50/242* (2021.01); *H01M 50/249* (2021.01); *H01M 50/507* (2021.01); *H01M 50/516* (2021.01); *H01M 2220/20* (2013.01); *Y02E 60/10* (2013.01); *Y02T 10/70* (2013.01)

(58) Field of Classification Search
CPC ......... H01M 10/6567; H01M 2220/20; H01M 2/1077; H01M 2/1083; H01M 2/206; H01M 50/24; H01M 50/242; H01M 50/249; H01M 50/507; H01M 50/516; Y02E 60/122; Y02E 60/10; B60L 50/64; Y02T 10/70
See application file for complete search history.

(56) References Cited

U.S. PATENT DOCUMENTS

| | | | |
|---|---|---|---|
| 2012/0177971 A1* | 7/2012 | Cicero | H01M 2/1077 429/120 |
| 2015/0221914 A1* | 8/2015 | Page | H01M 2/1016 429/82 |

\* cited by examiner

VEHICLE ENERGY-STORAGE SYSTEMS HAVING PARALLEL COOLING

CROSS-REFERENCE TO RELATED APPLICATIONS

This application is a continuation-in-part of U.S. patent application Ser. No. 14/868,234, filed Sep. 28, 2015, which is a continuation of U.S. patent application Ser. No. 14/841,617, filed Aug. 31, 2015, which claims the benefit of U.S. Provisional Application No. 62/186,977, filed on Jun. 30, 2015. The subject matter of the aforementioned applications is incorporated herein by reference for all purposes.

FIELD

The present application relates generally to energy-storage systems, and more specifically to energy-storage systems for vehicles.

BACKGROUND

It should not be assumed that any of the approaches described in this section qualify as prior art merely by virtue of their inclusion in this section.

Electric-drive vehicles offer a solution for reducing the impact of fossil-fuel engines on the environment and transforming automotive mobility into a sustainable mode of transportation. Energy-storage systems are essential for electric-drive vehicles, such as hybrid electric vehicles, plug-in hybrid electric vehicles, and all-electric vehicles. However, present energy-storage systems have disadvantages including large size, inefficiency, and poor safety, to name a few. Similar to many sophisticated electrical systems, heat in automotive energy-storage systems should be carefully managed. Current thermal management schemes consume an inordinate amount of space. Present energy-storage systems also suffer from inefficiencies arising variously from imbalance among battery cells and resistance in various electrical connections. In addition, current energy-storage systems are not adequately protected from forces such as crash forces encountered during a collision.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to various embodiments, the present technology may be directed to vehicle energy-storage systems having parallel cooling comprising: a plurality of modules, each module comprising two half modules coupled together, each half module including: a plurality of battery cells, the battery cells being cylindrical rechargeable battery cells each having a first end and a second end, the first end distal from the second end, and having an anode terminal and a cathode terminal being disposed at the first end; a current carrier electrically coupled to the battery cells, the cathode terminal of each of the battery cells being coupled to a respective first contact of the current carrier, the anode terminal of each of the battery cells being coupled to a respective second contact of the current carrier; a plate disposed substantially parallel to the current carrier such that the battery cells are disposed between the current carrier and the plate; and an enclosure having the battery cells, current carrier, and plate disposed therein, the enclosure comprising: a coolant input port; a coolant output port; and a power connector electrically coupled to the current carrier, the enclosure having a coolant sub-system for circulating coolant flowing into the enclosure through the coolant input port and out of the enclosure through the coolant output port in parallel such that each of the battery cells is at approximately the same predetermined temperature; a tray having the plurality of modules disposed therein; and a coolant system for circulating coolant flowing into the tray across the plurality of modules and battery cells in parallel such that each of the modules is at approximately the same predetermined temperature.

In some embodiments, the vehicle energy-storage system may also include a plurality of intumescent material sheets that are flame-activated to redirect flames during a thermal event away from the battery modules and high voltage connections.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
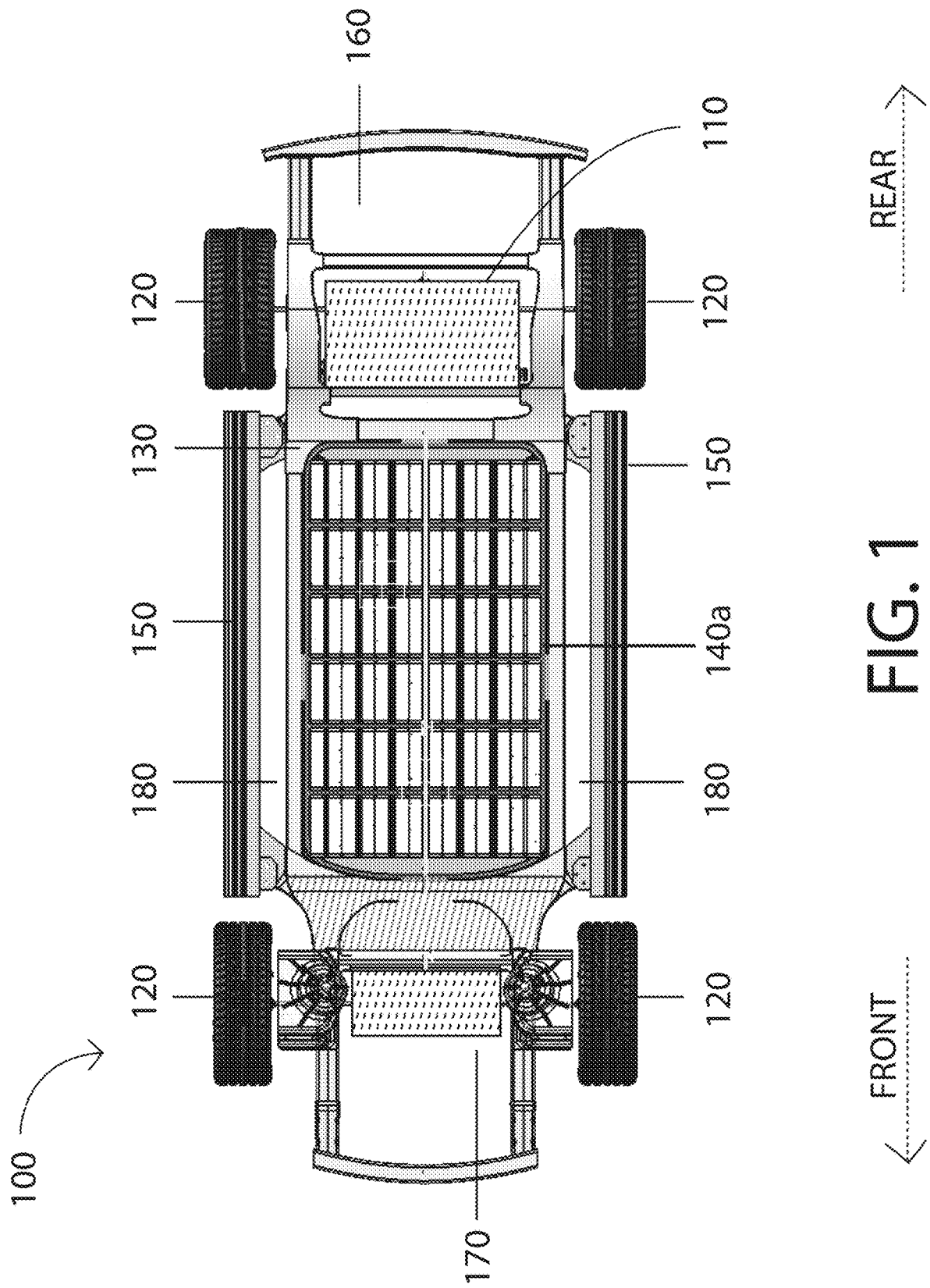
FIG. 1 illustrates an example environment in which an energy-storage system can be used.

While this technology is susceptible of embodiment in many different forms, there are shown in the drawings and will herein be described in detail several specific embodiments, with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Some embodiments of the present invention can be deployed in a wheeled, self-powered motor vehicle used for transportation, such as hybrid electric vehicles, plug-in hybrid electric vehicles, and all-electric vehicles. For example, FIG. 1 illustrates an electric car 100. Electric car 100 is an automobile propelled by one or more electric motors 110. Electric motor 110 can be coupled to one or more wheels 120 through a drivetrain (not shown in FIG. 1). Electric car 100 can include a frame 130 (also known as an underbody or chassis). Frame 130 is a supporting structure of electric car 100 to which other components can be attached/mounted, such as, for example, a battery pack 140a. Battery pack 140a can supply electricity to power one or more electric motors 110, for example, through an inverter. The inverter can change direct current (DC) from battery pack 140a to alternating current (AC), as required for electric motors 110, according to some embodiments.

As depicted in FIG. 1, battery pack 140a may have a compact "footprint" and be at least partially enclosed by frame 130 and disposed to provide a predefined separation, e.g. from structural rails 150 of an upper body that couples to frame 130. Accordingly, at least one of a rear crumple zone 160, a front crumple zone 170, and a lateral crumple zone 180 can be formed around battery pack 140a. Both the frame 130 and structural rails 150 may protect battery pack 140a from forces or impacts exerted from outside of electric car 100, for example, in a collision. In contrast, other battery packs which extend past at least one of structural rails 150, rear crumple zone 160, and front crumple zone 170 remain vulnerable to damage and may even explode in an impact.

Battery pack 140a may have a compact "footprint" such that it may be flexibly used in and disposed on frame 130 having different dimensions. Battery pack 140a can also be disposed in frame 130 to help improve directional stability (e.g., yaw acceleration). For example, battery pack 140a can be disposed in frame 130 such that a center of gravity of electric car 100 is in front of the center of the wheelbase (e.g., bounded by a plurality of wheels 120).

Figure 2A:
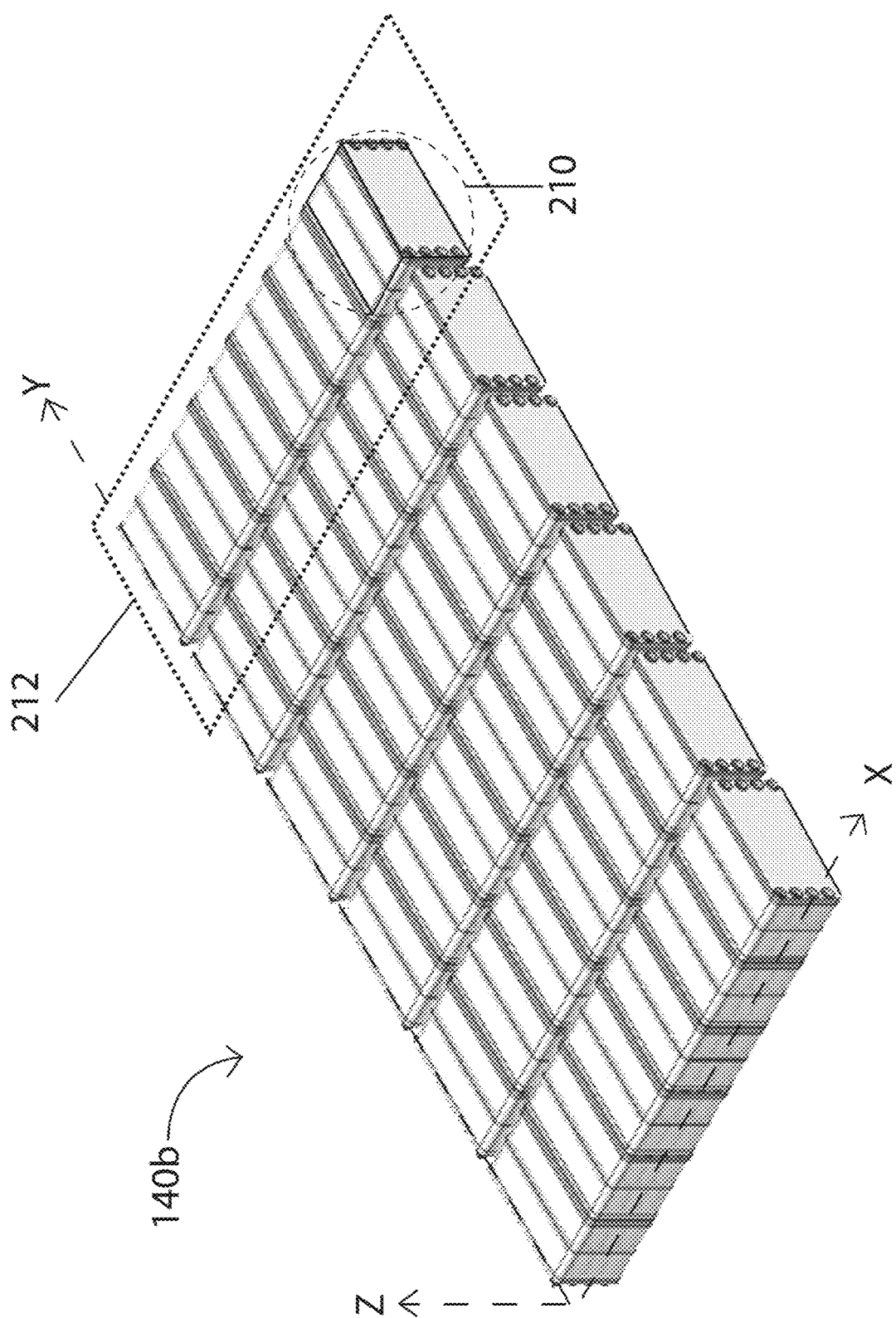
FIG. 2A shows an orientation of battery modules in an energy-storage system, according to various embodiments of the present disclosure.

FIG. 2A shows a battery pack 140b with imaginary x-, y-, and z-axis superimposed, according to various embodiments. Battery pack 140b can include a plurality of battery modules 210. In the non-limiting example, battery pack 140b can be approximately 1000 mm wide (along x-axis), 1798 mm long (along y-axis), and 152 mm high (along z-axis), and can include 36 of battery modules 210.

Figure 2B:
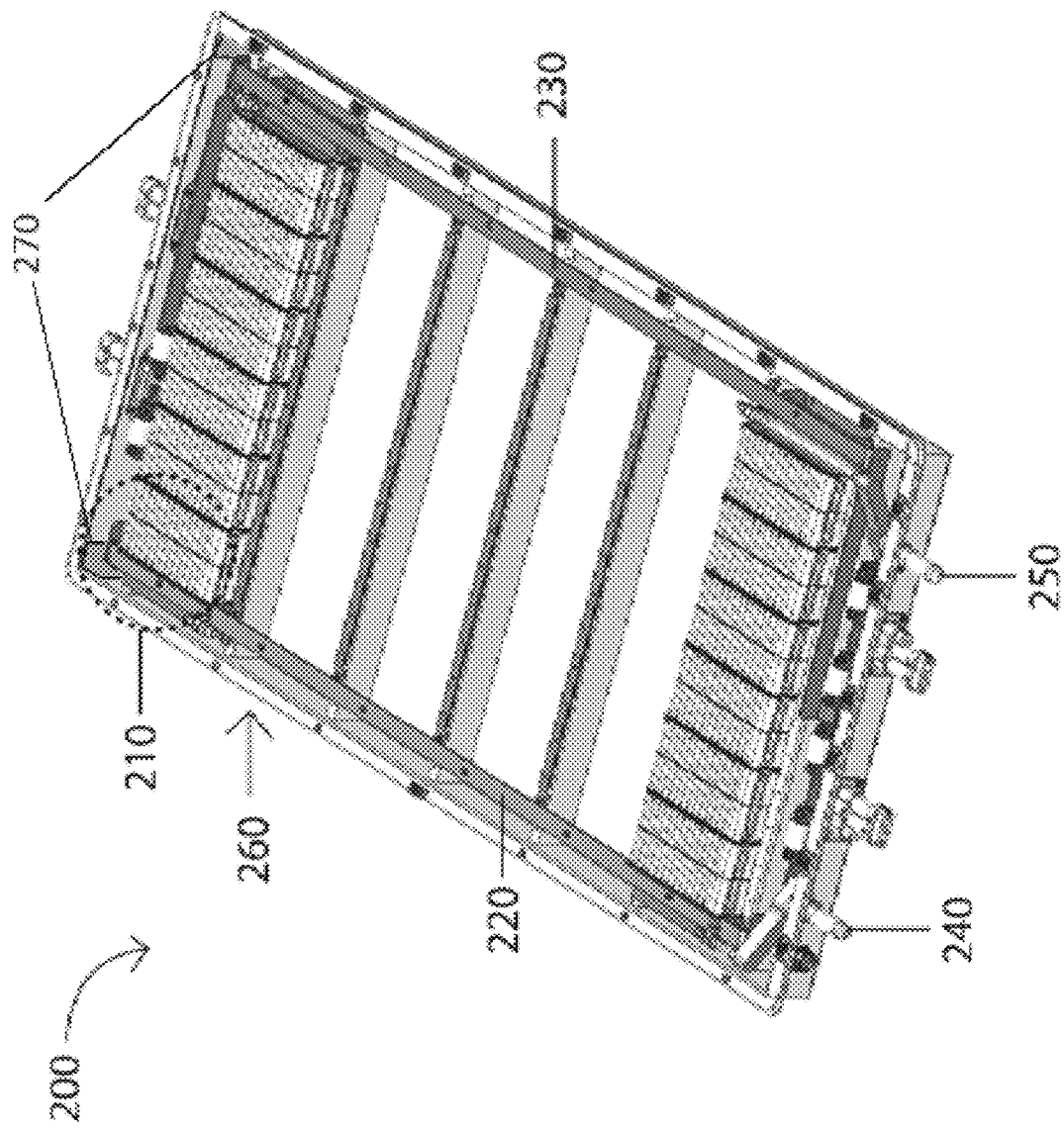
FIG. 2B depicts a bottom part of an enclosure of a partial battery pack such as shown in FIG. 2A.

FIG. 2B illustrates an exemplary enclosure 200 for battery pack 140b having a cover removed for illustrative purposes. Enclosure 200 includes tray 260 and a plurality of battery modules 210. The tray 260 may include a positive bus bar 220 and a negative bus bar 230. Positive bus bar 220 can be electrically coupled to a positive (+) portion of a power connector of each battery module 210. Negative bus bar 230 can be electrically coupled to a negative (−) portion of a power connector of each battery module 210. Positive bus bar 220 is electrically coupled to a positive terminal 240 of enclosure 200. Negative bus bar 230 can be electrically coupled to a negative terminal 250 of enclosure 200. As described above with reference to FIG. 1, because bus bars 220 and 230 are within structural rails 150, they can be protected from collision damage. In some embodiments, flame-activated intumescent sheets 270 can be included at the corners of the battery pack so that, in the event of a battery-pack level thermal runaway event (e.g., a fire), the material can swell to seal the gap between battery strings 212 and high voltage battery pack connections to slow down or halt propagation of the thermal runaway event.

According to some embodiments, negative bus bar 230 and positive bus bar 220 are disposed along opposite edges of tray 260 to provide a predefined separation between negative bus bar 230 and positive bus bar 220. Such separation between negative bus bar 230 and positive bus bar 220 can prevent or at least reduce the possibility of a short circuit (e.g., of battery pack 140b) due to a deformity caused by an impact.

As will be described further in more detail with reference to FIG. 5, battery module 210 can include at least one battery cell (details not shown in FIG. 2A, see FIG. 7). The at least one battery cell can include an anode terminal, a cathode terminal, and a cylindrical body. The battery cell can be disposed in each of battery module 210 such that a surface of the anode terminal and a surface of the cathode terminal are normal to the imaginary x-axis referenced in FIG. 2A (e.g., the cylindrical body of the battery cell is parallel to the imaginary x-axis). This can be referred to as an x-axis cell orientation.

Figure 9:
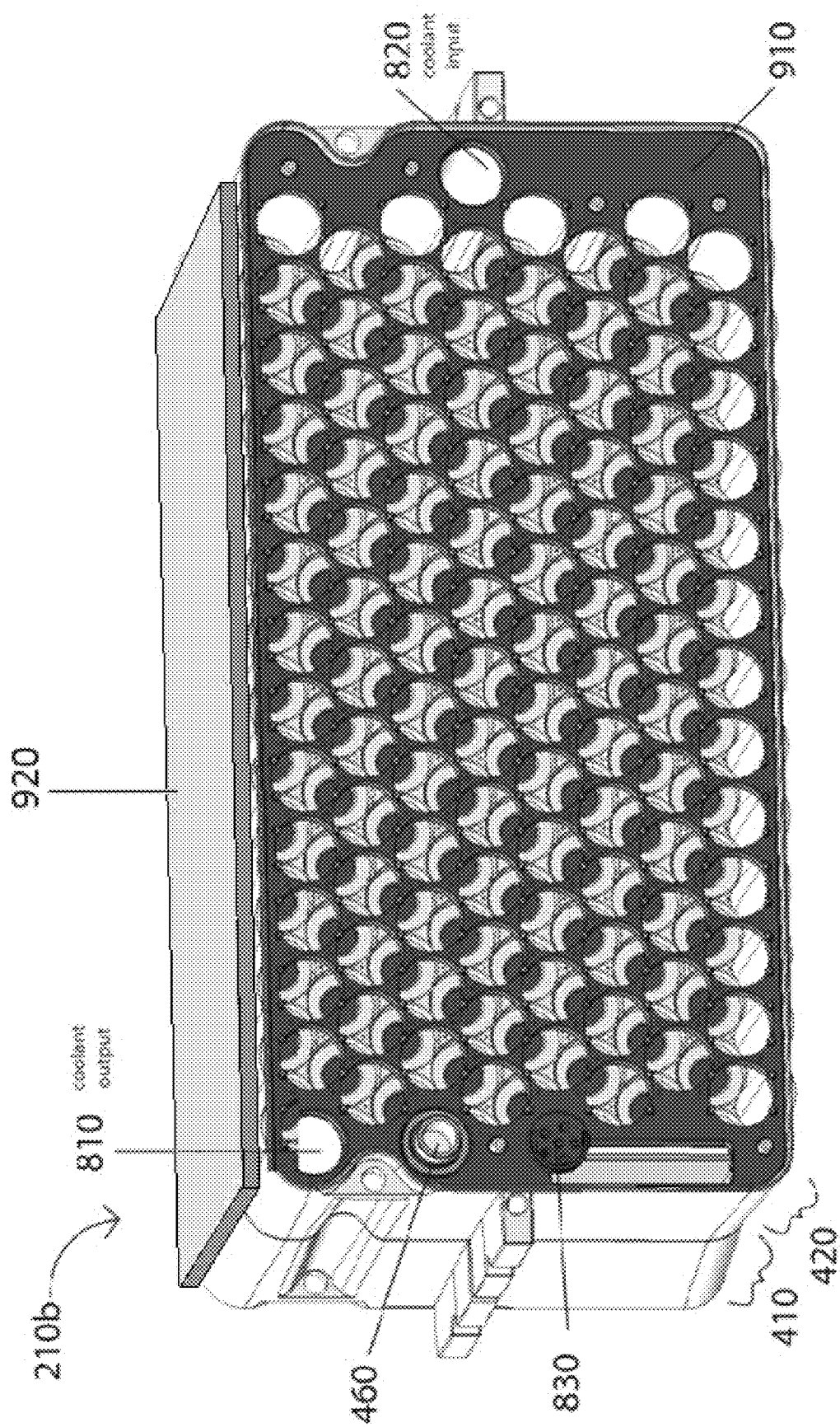

In the event of fire and/or explosion in one or more of battery modules 210, the battery cells can be vented along the x-axis, advantageously minimizing a danger and/or a harm to a driver, passenger, cargo, and the like, which may be disposed in electric car 100 above battery pack 140b (e.g., along the z-axis), in various embodiments. As further support, sheets of flame-activated intumescent material 920 can be included in various embodiments atop the exterior of battery modules as shown in FIG. 9 to seal off gaps and redirect flames away from the passenger compartment, other battery modules 210, or the high voltage bus connections 240 and 250.

The x-axis cell orientation of battery modules 210 in battery pack 140b shown in FIGS. 2A and 2B can be advantageous for efficient electrical and fluidic routing to each of battery module 210 in battery pack 140b. For example, at least some of battery modules 210 can be electrically connected in a series forming string 212, and two or more of string 212 can be electrically connected in parallel. This way, in the event one of string 212 fails, others of string 212 may not be affected, according to various embodiments.

Figure 3:
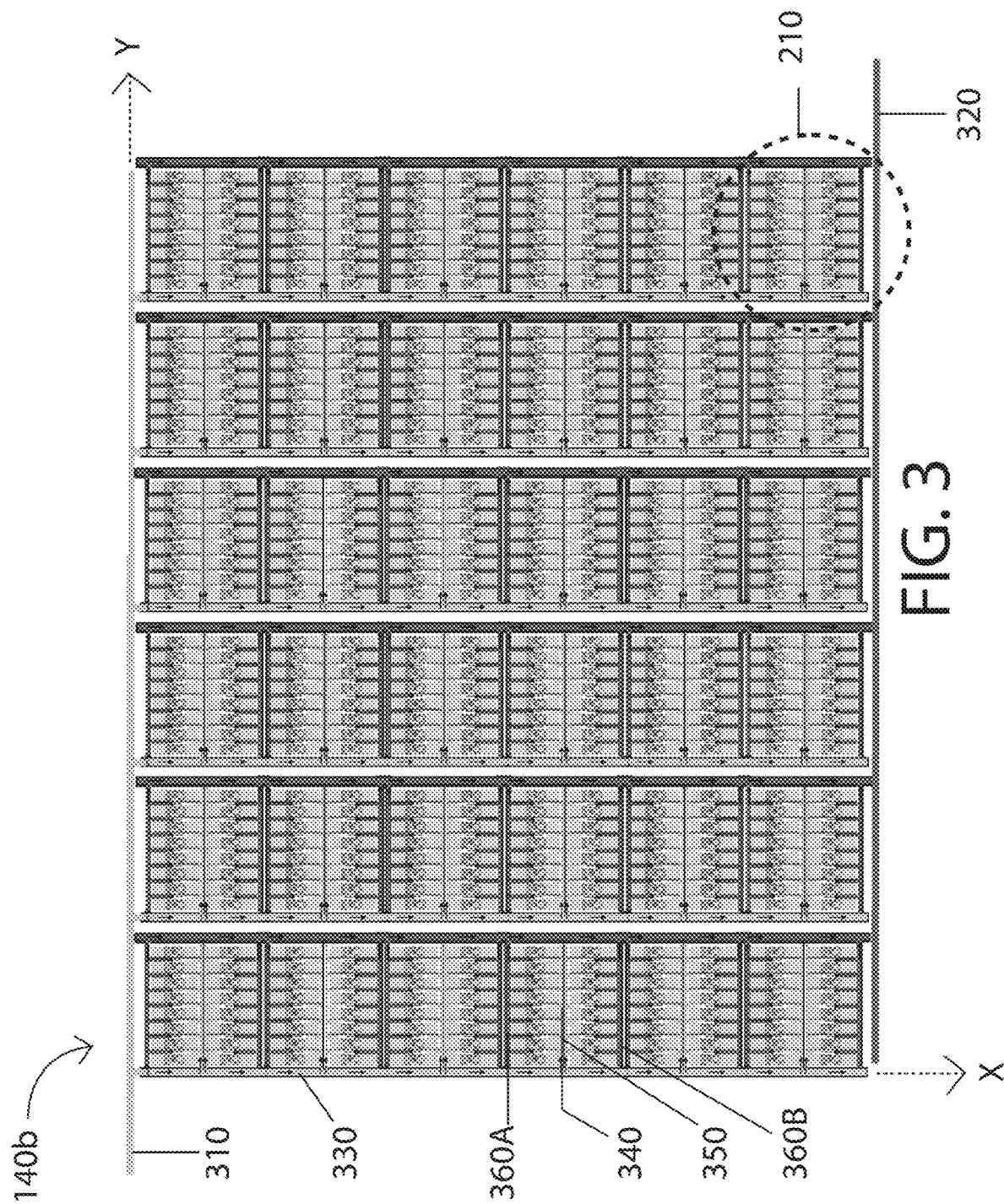
FIG. 3 is a simplified diagram illustrating coolant flows, according to example embodiments.

FIG. 3 illustrates coolant flows and operation of a coolant system and a coolant sub-system according to various embodiments. As shown in FIG. 3, the x-axis cell orientation can be advantageous for routing coolant (cooling fluid) in parallel to each of battery modules 210 in battery pack 140b. Coolant can be pumped into battery pack 140b at ingress 310 and pumped out of battery pack 140b at egress 320. A resulting pressure gradient within battery pack 140b can provide sufficient circulation of coolant to minimize a temperature gradient within battery pack 140b (e.g., a temperature gradient within one of battery modules 210, a temperature gradient between battery modules 210, and/or a temperature gradient between two or more of string 212 shown in FIG. 2A).

Within battery pack 140b, the coolant system may circulate the coolant, for example, to battery modules 210 (e.g., the circulation is indicated by reference numeral 330). One or more additional pumps (not shown in FIG. 3) can be used to maintain a roughly constant pressure between multiple battery modules 210 connected in series (e.g., in string 212 in FIG. 2A) and between such strings. Within each battery module 210, the coolant sub-system may circulate the coolant, for example, between and within two half modules 410 and 420 shown in FIG. 4 (e.g., the circulation indicated by reference numeral 340). In some embodiments, the coolant can enter each battery module 210 through an interface 350 between two half modules 410 and 420, in a direction (e.g., along the y- or z-axis) perpendicular to the cylindrical body of each battery cell, and flow to each cell. Driven by pressure within the coolant system, the coolant then can flow along the cylindrical body of each battery (e.g., along the x-axis) and may be collected at the two (opposite) side surfaces 360A and 360B of the module that can be normal to the x-axis. In this way, heat can be efficiently managed/dissipated and thermal gradients minimized among all battery cells in battery pack 140b, such that a temperature may be maintained at an approximately uniform level.

In some embodiments, parallel cooling, as illustrated in FIG. 3, can maintain temperature among battery cells in battery pack 140b at an approximately uniform level such that a direct current internal resistance (DCIR) of each battery cell is maintained at an substantially predefined resistance. The DCIR can vary with a temperature, therefore, keeping each battery cell in battery pack 140b at a substantially uniform and predefined temperature can result in each battery cell having substantially the same DCIR. Since a voltage across each battery cell can be reduced as a function of its respective DCIR, each battery cell in battery pack 140b may experience substantially the same loss in voltage. In this way, each battery cell in battery pack 140b can be maintained at approximately the same capacity and imbalances between battery cells in battery pack 140b can be minimized.

In some embodiments, when compared to techniques using metal tubes to circulate coolant, parallel cooling can enable higher battery cell density within battery module 210 and higher battery module density in battery pack 140b. In some embodiments, coolant or cooling fluid may be at least one of the following: synthetic oil, for example, poly-alpha-olefin (or poly-α-olefin, also abbreviated as PAO) oil, ethylene glycol and water, liquid dielectric cooling based on phase change, and the like.

Figure 4:
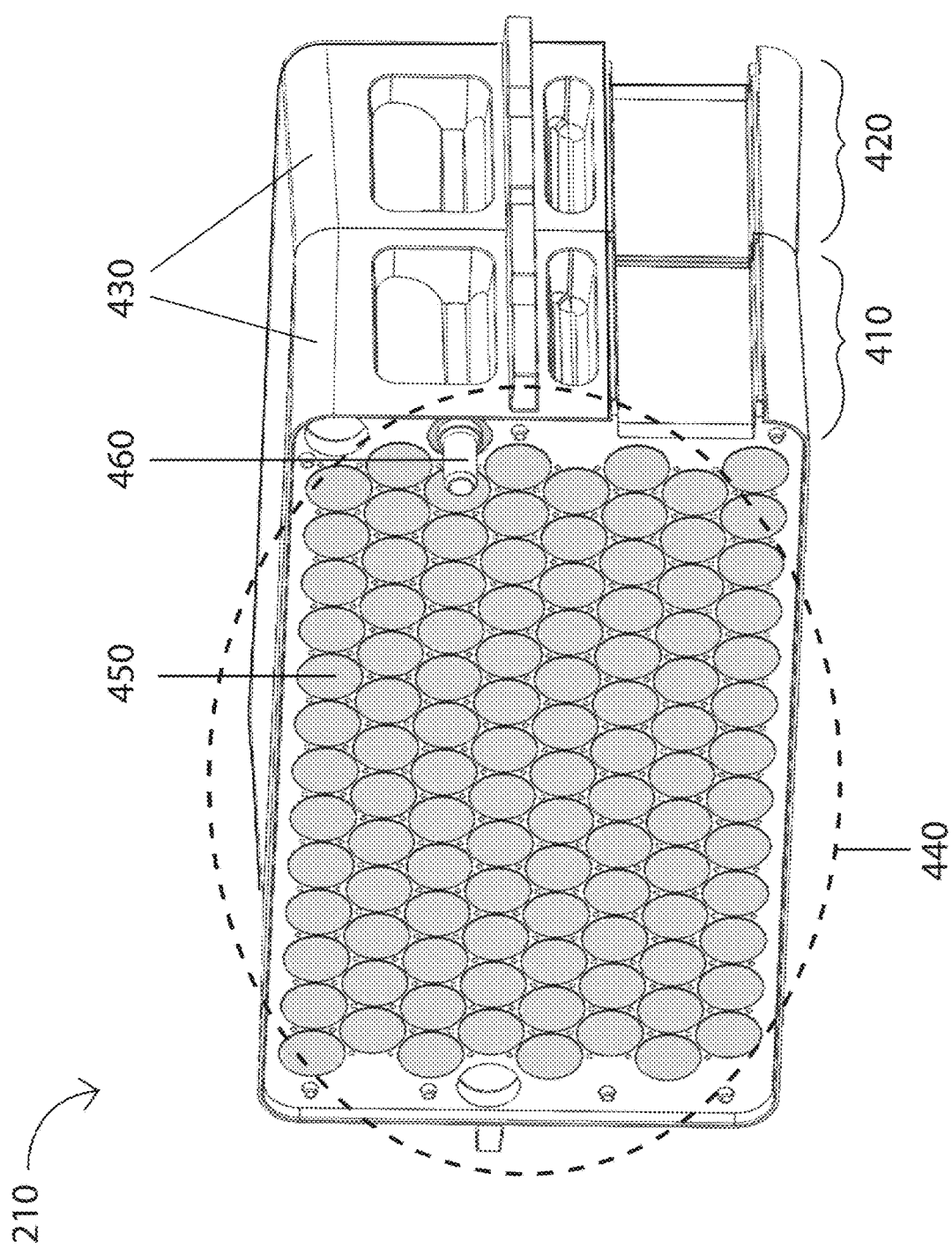
FIG. 4 is a simplified diagram of a battery module, according to various embodiments of the present disclosure.

FIG. 4 illustrates battery module 210 according to various embodiments. A main power connector 460 can provide power from battery cells 450 to outside of battery module 210. In some embodiments, battery module 210 can include two half modules 410 and 420, each having an enclosure 430. Enclosure 430 may be made using one or more plastics having sufficiently low thermal conductivities. Respective enclosures 430 of each of the two half modules 410 and 420 may be coupled with each other to form the housing for battery module 210.

FIG. 4 includes a view 440 of enclosure 430 (e.g., with a cover removed). For each of half modules 410, 420 there is shown a plurality of battery cells 450 oriented (mounted) horizontally (see also FIG. 5 and FIG. 8). By way of non-limiting example, each half module includes one hundred four of battery cells 450. By way of further non-limiting example, eight of battery cells 450 are electrically connected in a series (e.g., the staggered column of eight battery cells 450 shown in FIG. 4), with a total of thirteen of such groups of eight battery cells 450 electrically connected in series. By way of additional non-limiting example, the thirteen groups (e.g., staggered columns of eight battery cells 450 electrically coupled in series) are electrically connected in parallel. This example configuration may be referred to as "8S13P" (8 series, 13 parallel). In some embodiments, the 8S13P electrical connectivity can be provided by current carrier 510, described further below in relation to FIGS. 5 and 6. Other combinations and permutations of battery cells 450 electrically coupled in series and/or parallel may be used.

Figure 5:
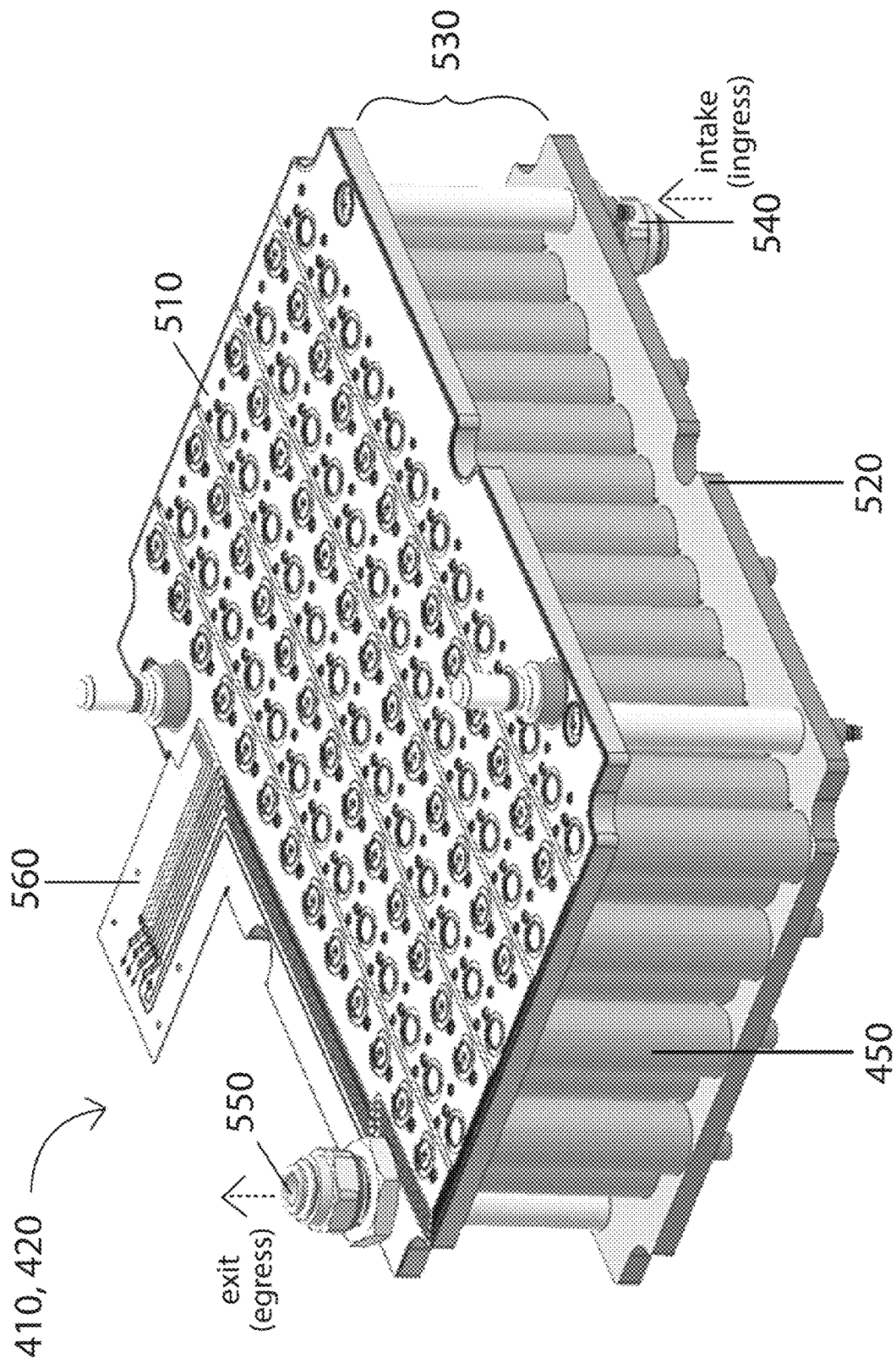
FIG. 5 illustrates a half module, in accordance with various embodiments.

FIG. 5 depicts a view of half modules 410, 420 without enclosure 430 in accordance with various embodiments. Half modules 410 and 420 need not be the same, e.g., they may be mirror images of each other in some embodiments. Half modules 410 and 420 can include a plurality of battery cells 450. The plurality of battery cells 450 can be disposed between current carrier 510 and blast plate 520 such that an exterior side of each of battery cells 450 is not in contact with the exterior sides of other (e.g., adjacent) battery cells 450. In this way, coolant can circulate among and between battery cells 450 to provide submerged, evenly distributed cooling. In addition, to save the weight associated with coolant in areas where cooling is not needed, air pockets can be formed using channels craftily designed in the space 530 between current carrier 510 and blast plate 520 not occupied by battery cells 450. Coolant can enter half modules 410, 420 through coolant intake 540, is optionally directed by one or more flow channels, circulates among and between the plurality of battery cells 450, and exits through coolant outtake 550. In some embodiments, coolant intake 540 and coolant outtake 550 can each be male or female fluid fittings. In some embodiments, coolant or cooling fluid is at least one of: synthetic oil such as poly-alpha-olefin (or poly-α-olefin, abbreviated as PAO) oil, ethylene glycol and water, liquid dielectric cooling based on phase change, and the like. Compared to techniques using metal tubes to circulate coolant, submerged cooling improves a packing density of battery cells 450 (e.g., inside battery module 210 and half modules 410, 420) by 15%, in various embodiments.

Figure 6A:
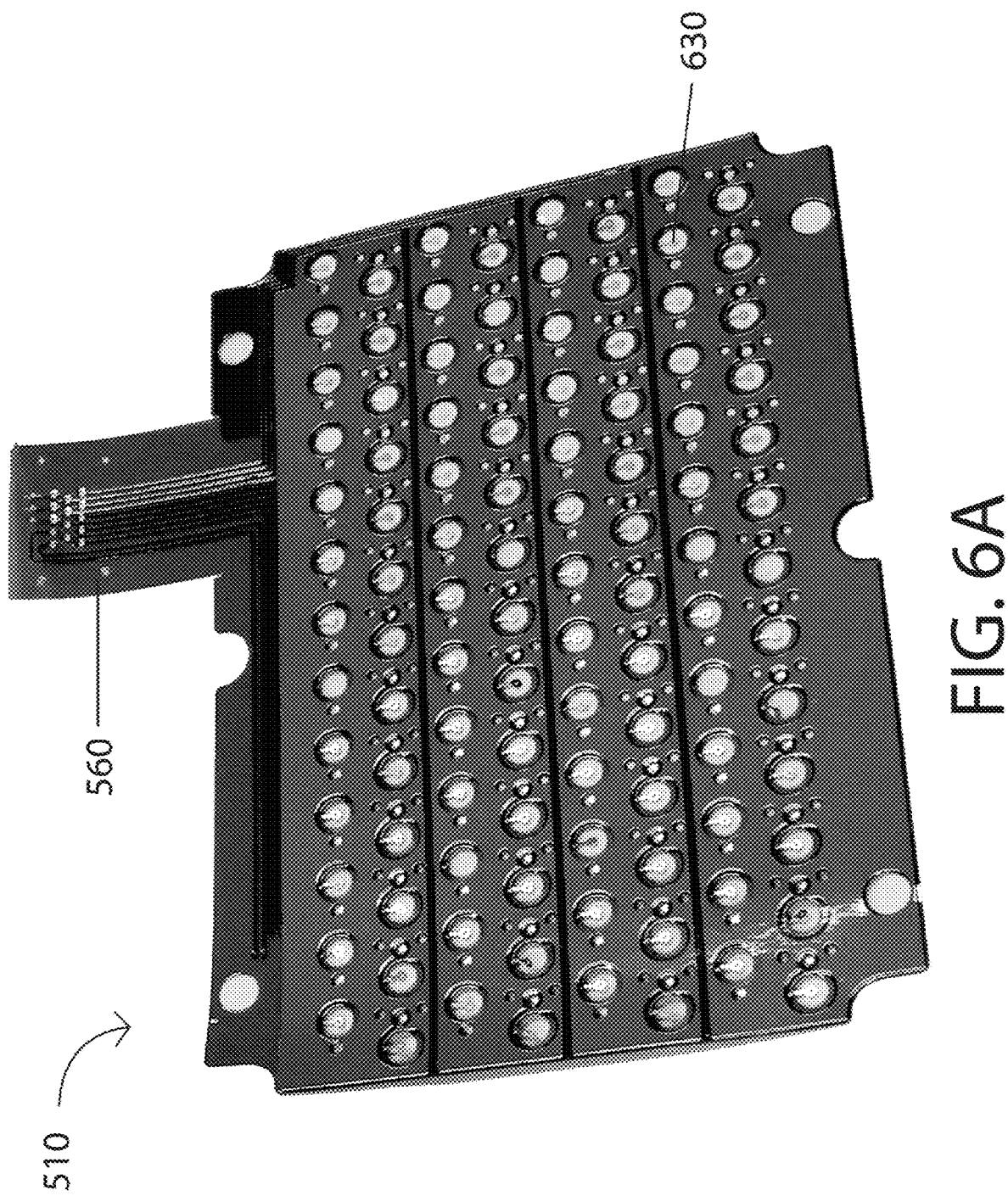
FIGS. 6A and 6B show a current carrier, according to various embodiments.
Figure 6B:
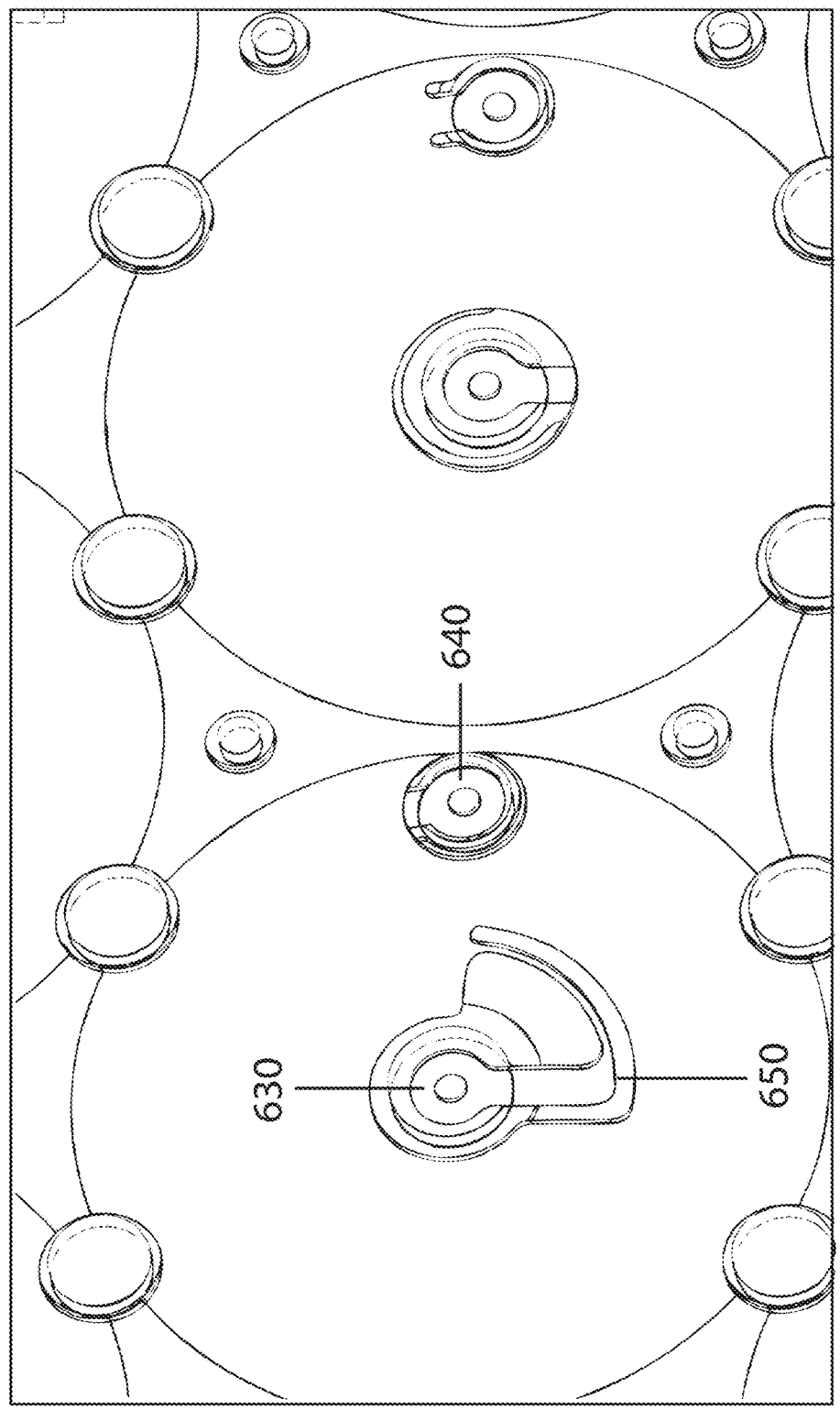

FIGS. 6A and 6B depict current carrier 510, 510A according to various embodiments. Current carrier 510, 510A is generally flat (or planar) and comprises one or more layers (not shown in FIGS. 6A and 6B), such as a base layer, a positive power plane, a negative power plane, and signal plane sandwiched in-between dielectric isolation layers (e.g., made of polyimide). In some embodiments, the signal plane can include signal traces and be used to provide battery module telemetry (e.g., battery cell voltage, current, state of charge, and temperature from optional sensors on current carrier 510) to outside of battery module 210.

As depicted in FIG. 6B, current carrier 510A can be a magnified view of a portion of current carrier 510, for illustrative purposes. Current carrier 510A can be communicatively coupled to each of battery cells 450, for example, at a separate (fused) positive (+) portion 630 and a separate negative (−) portion 640 which may be electrically coupled to the positive power plane and negative power plane (respectively) of current carrier 510A, and to each cathode and anode (respectively) of a battery cell 450. In some embodiments, positive (+) portion 630 can be laser welded to a cathode terminal of battery cell 450, and negative (−) portion 640 can be laser welded to an anode terminal of battery cell 450. In some embodiments, the laser-welded connection can have on the order of 5 milli-Ohms resistance. In contrast, electrically coupling the elements using ultrasonic bonding of aluminum bond wires can have on the order of 10 milli-Ohms resistance. Laser welding advantageously can have lower resistance for greater power efficiency and take less time to perform than ultrasonic wire bonding, which can contribute to greater performance and manufacturing efficiency.

Current carrier 510A can include a fuse 650 formed from part of a metal layer (e.g., copper, aluminum, etc.) of current carrier 510A, such as in the positive power plane. In some embodiments, the fuse 650 can be formed (e.g., laser etched) in a metal layer (e.g., positive power plane) to dimensions corresponding to a type of low-resistance resistor and acts as a sacrificial device to provide overcurrent protection. For example, in the event of thermal runaway of one of battery cell 450 (e.g., due to an internal short circuit), the fuse may "blow," breaking the electrical connection to the battery cell 450 and electrically isolating the battery cell 450 from current carrier 510A. Although an example of a fuse formed in the positive power plane is provided, a fuse may additionally or alternatively be a part of the negative power plane.

Additional thermal runaway control can be provided in various embodiments by scoring on end 740 (identified in FIG. 7) of the battery cell 450. The scoring can promote rupturing to effect venting in the event of over pressure. In various embodiments, all battery cells 450 may be oriented to allow venting into the blast plate 520 for both half modules.

In some embodiments, current carrier 510 can be comprised of a printed circuit board and a flexible printed circuit. For example, the printed circuit board may variously comprise at least one of copper, FR-2 (phenolic cotton paper), FR-3 (cotton paper and epoxy), FR-4 (woven glass and epoxy), FR-5 (woven glass and epoxy), FR-6 (matte glass and polyester), G-10 (woven glass and epoxy), CEM-1 (cotton paper and epoxy), CEM-2 (cotton paper and epoxy), CEM-3 (non-woven glass and epoxy), CEM-4 (woven glass and epoxy), and CEM-5 (woven glass and polyester). By way of further non-limiting example, the flexible printed circuit may comprise at least one of copper foil and a flexible polymer film, such as polyester (PET), polyimide (PI), polyethylene naphthalate (PEN), polyetherimide (PEI), along with various fluoropolymers (FEP), and copolymers.

In addition to electrically coupling battery cells 450 to each other (e.g., in series and/or parallel), current carrier 510 can provide electrical connectivity to outside of battery module 210, for example, through main power connector 460 (FIG. 4). Current carrier 510 may also include electrical interface 560 (FIGS. 5, 6A) which transports signals from the signal plane. Electrical interface 560 can include an electrical connector (not shown in FIGS. 5, 6A).

Figure 7:
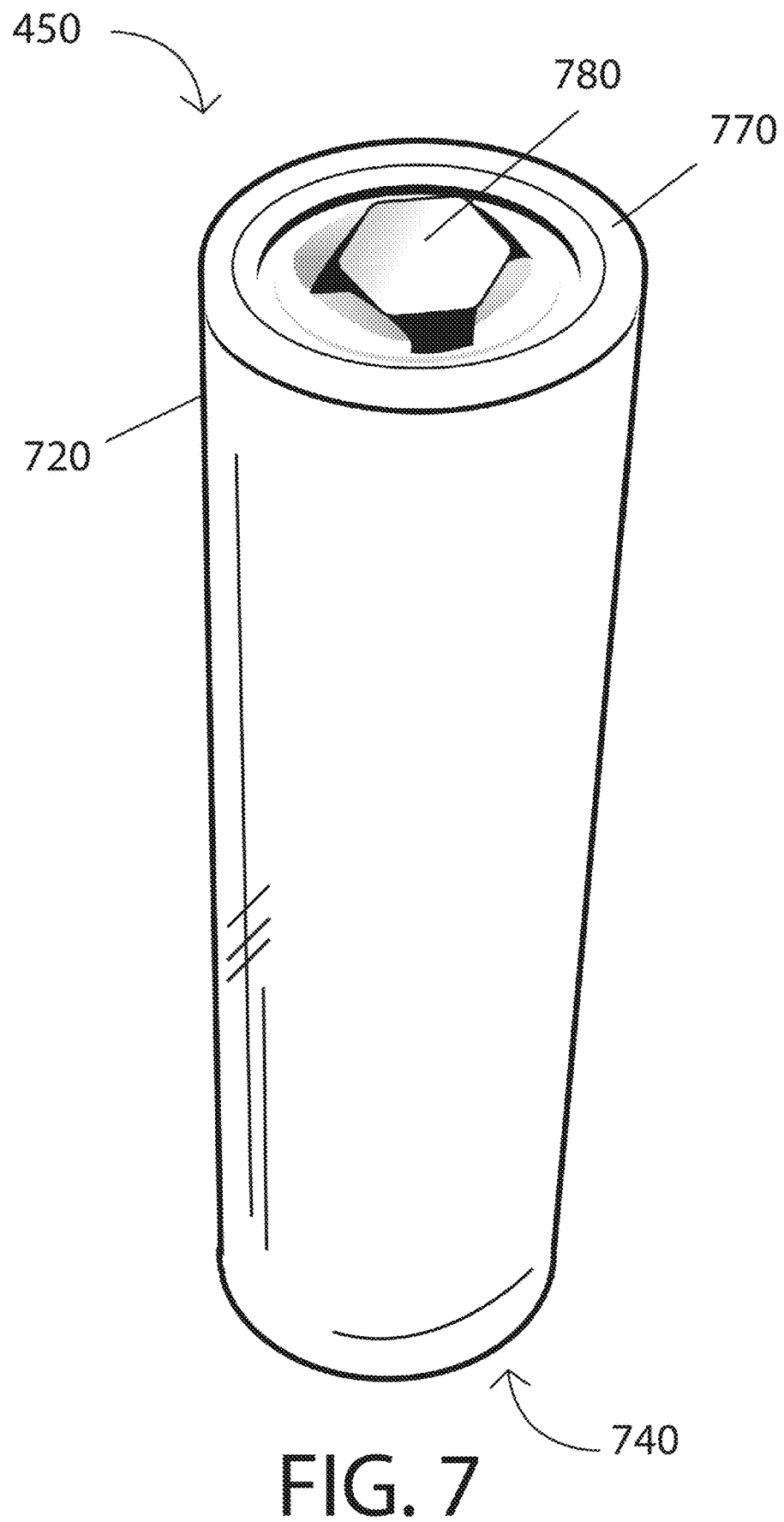
FIG. 7 depicts an example battery cell.

FIG. 7 shows battery cell 450 according to some embodiments. In some embodiments, battery cell 450 can be a lithium ion (li-ion) battery. For example, battery cell 450 may be an 18650 type li-ion battery having a cylindrical shape with an approximate diameter of 18.6 mm and approximate length of 65.2 mm. Other rechargeable battery form factors and chemistries can additionally or alternatively be used. In various embodiments, battery cell 450 may include can 720 (e.g., the cylindrical body), anode terminal 770, and cathode terminal 780. For example, anode terminal 770 can be a negative terminal of battery cell 450 and cathode terminal 780 can be a positive terminal of battery cell 450. Anode terminal 770 and cathode terminal 780 can be electrically isolated from each other by an insulator or dielectric.

Figure 8:
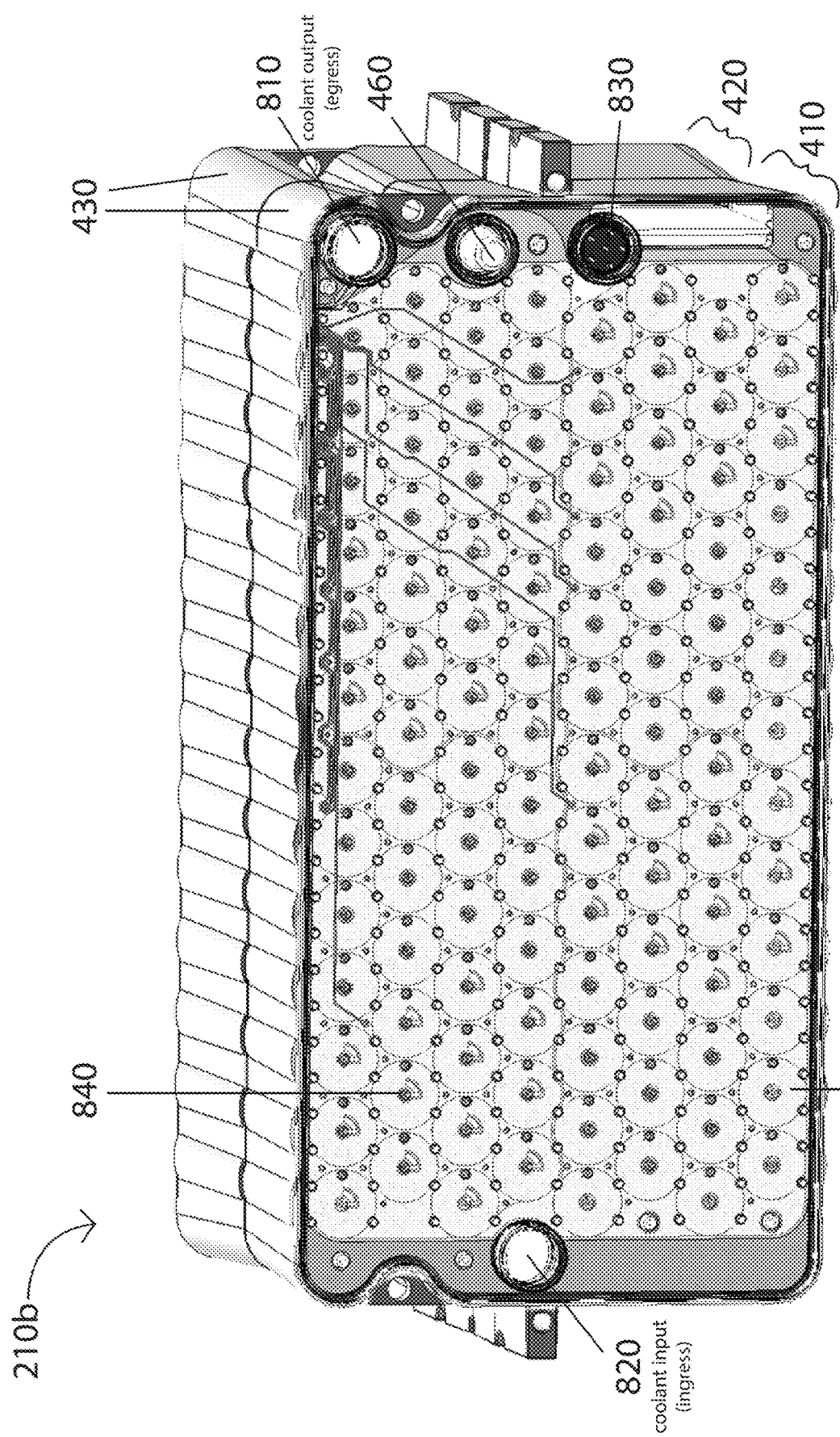
FIGS. 8 and 9 illustrate further embodiments of a battery module.

FIG. 8 illustrates another example of a battery module, battery module 210b, according to various embodiments. As described in relation to battery module 210 in FIG. 4, battery module 210b may include two half modules 410 and 420 and main power connector 460. Each of half modules 410 and 420 may include one of enclosure 430 for housing battery cells therein. Battery module 210b further depicts main coolant input port 820, main coolant output port 810, and communications and low power connector 830. Coolant can be provided to battery module 210b at main coolant input port 820, circulated within battery module 210b, and received at main coolant output port 810.

In contrast to the view of battery module 210 in FIG. 4, FIG. 8 depicts current carrier 510. Battery module 210b may include one or more staking features 840 to hold current carrier 510 in battery module 210b. For example, staking feature 840 can be a plastic stake. In some embodiments, communications and low power connector 830 can be at least partially electrically coupled to the signal plane and/or electrical interface 560 of current carrier 510, for example, through electronics for data acquisition and/or control (not shown in FIG. 8). Communications and low power connector 830 may provide low power, for example, to electronics for data acquisition and/or control, and sensors.

FIG. 9 shows another view of battery module 210b where the battery cells and the current carrier are removed from one of the half modules, for illustrative purposes. As described in relation to FIGS. 4 and 8, battery module 210b may include two half modules 410 and 420, main power connector 460, main coolant output port 810, main coolant input port 820, and communications and low power connector 830. Each of the half modules 410 and 420 can include an enclosure 430. Each enclosure 430 may further include plate 910 (e.g., a bracket). Plate 910 may include structures for securing the battery cells within enclosure 430 and maintaining the distance between battery cells. Flame-activated intumescent sheets 920 are available in some embodiments to slow or halt propagation of thermal runaway events from one battery module 210 to any others in the battery pack 140b. These sheets may be affixed to the bottom of battery tray cover or along the top of battery modules 210 with any of various fixturing elements such as adhesive strips, bolts, or grips. Other embodiments may include fixturing these intumescent sheets 920 in other strategic locations around battery modules 210 such as below, in between, or along the sides.

Figure 10A:
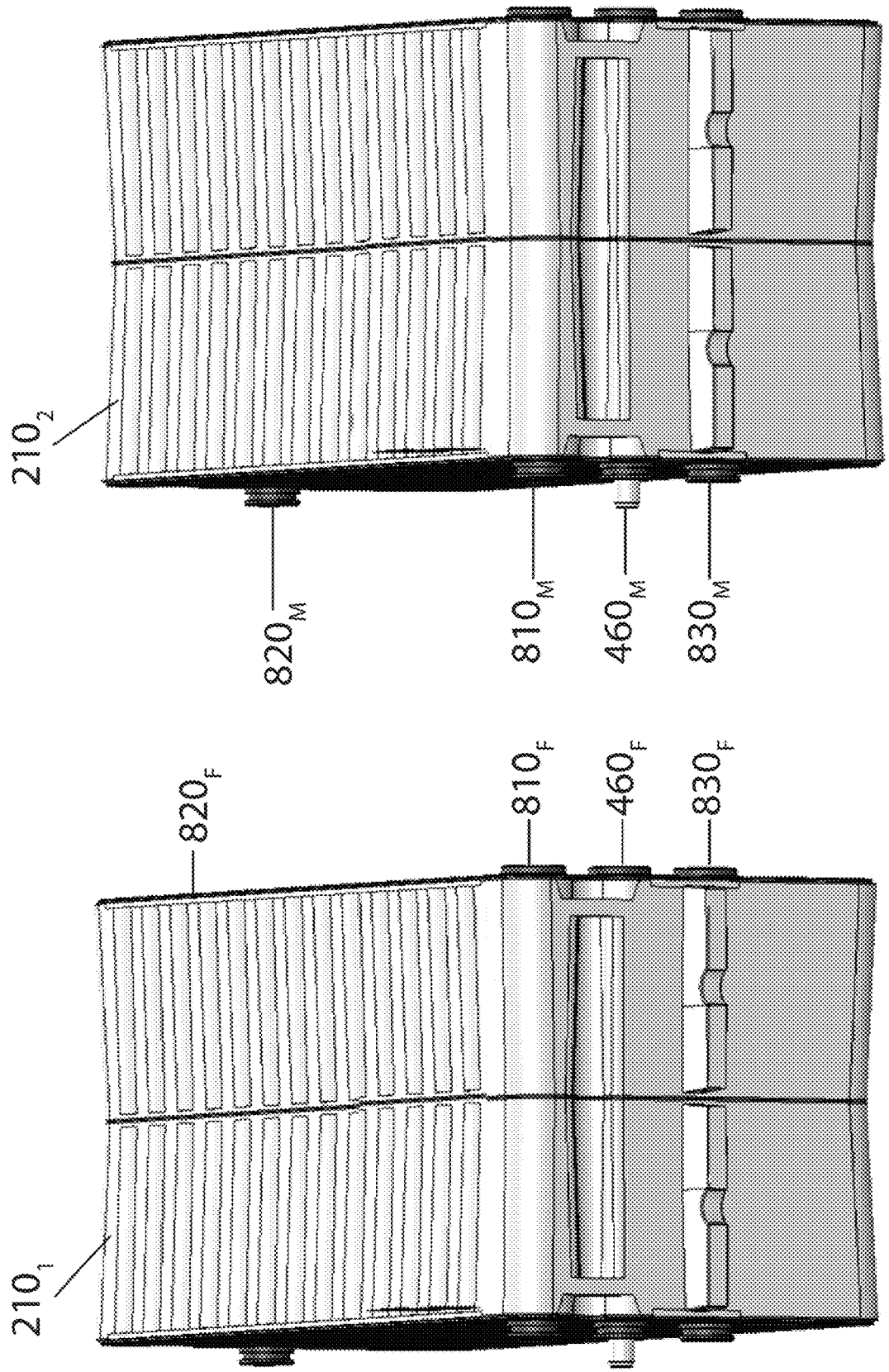
FIGS. 10A and 10B show battery module coupling, according to some embodiments.
Figure 10B:
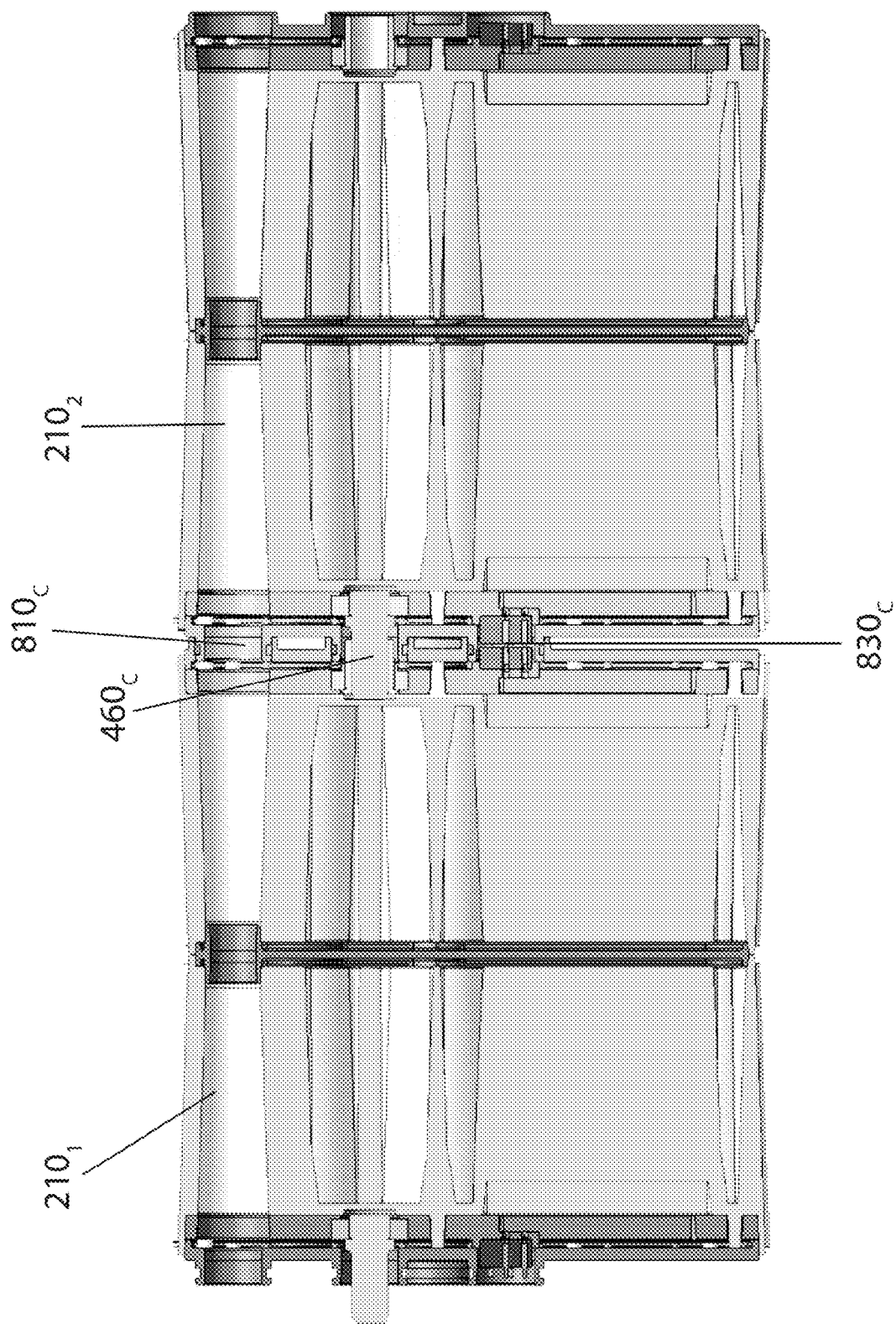

FIGS. 10A and 10B illustrate arrangement and coupling between two of battery modules 210b: $210_1$ and $210_2$. From different perspective views, FIG. 10A depicts battery modules $210_1$ and $210_2$ being apart and aligned for coupling. For example, battery modules $210_1$ and $210_2$ are positioned as shown in FIG. 10A and moved together until coupled as shown in the example in FIG. 10B. Generally, a female receptacle on one of battery modules $210_1$ and $210_2$ may receive and hold a male connector on the other of battery modules $210_2$ and $210_1$, respectively.

As shown in the example in FIG. 10A, a left side of battery modules $210_1$ and $210_2$ may have male connectors and a right side of battery modules $210_1$ and $210_2$ have female connectors, according to some embodiments. For example, the left sides of battery modules $210_1$ and $210_2$ include male main power connector $460_M$, male main coolant output port $810_M$, male main coolant input port $820_M$, and male communications and low power connector $830_M$. By way of further non-limiting example, the right sides of battery modules $210_1$ and $210_2$ can include female main power connector $460_F$, female main coolant output port $810_F$, female main coolant input port $820_F$, and female communications and low power connector $830_F$. Each of female main power connector $460_F$, female main coolant output port $810_F$, female main coolant input port $820_F$, and female communications and low power connector $830_F$ may include an (elastomer) o-ring or other seal. Other combinations and permutations of male and female connectors—such as a mix of male and female connectors on each side, and female connectors on the right side and male connectors on the left side—may be used.

FIG. 10B depicts a cross-sectional view of battery modules $210_1$ and $210_2$ of FIG. 10A coupled together. For example, male main power connector $460_M$ and female main power connector $460_F$ (FIG. 10A) can combine to form coupled main power connectors $460_C$, male main coolant output port $810_M$ and female main coolant output port $810_F$ can combine to form coupled main coolant output ports $810_C$, male main coolant input port $820_M$ and female main coolant input port $820_F$ can combine to form coupled main coolant input ports $820_C$ (not shown in FIG. 10B), and female communications and low power connector $830_F$ and male communications and low power connector $830_M$ can combine to form coupled communications and low power connectors $830_C$. As a result, the internal cooling channels or manifolds of the battery modules can be connected through the coupling between the modules, forming the cooling system schematically illustrated in FIG. 3.

As would be readily appreciated by one of ordinary skill in the art, various embodiments described herein may be used in additional applications, such as in energy-storage systems for wind and solar power generation. Other applications are also possible.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. An energy-storage system having parallel cooling comprising:
    a plurality of modules, each module comprising two half modules coupled together, each half module including:
        a plurality of battery cells, the battery cells being cylindrical rechargeable battery cells each having a first end and a second end, the first end distal from the second end, and having an anode terminal and a cathode terminal being disposed at the first end;
        a current carrier electrically coupled to the battery cells, the cathode terminal of each of the battery cells being coupled to a respective first contact of the current carrier, the anode terminal of each of the battery cells being coupled to a respective second contact of the current carrier;
        a plate disposed substantially parallel to the current carrier such that the battery cells are disposed between the current carrier and the plate; and
        an enclosure having the battery cells, current carrier, and plate disposed therein, the enclosure comprising:
            a male coolant input port;
            a female coolant input port;
            a male coolant output port;
            a female coolant output port; and
            a power connector electrically coupled to the current carrier, the enclosure having a coolant sub-system for circulating liquid coolant flowing into the enclosure through the male or female coolant input port and out of the enclosure through the male and female coolant output port in parallel to the plurality of battery cells such that each of the battery cells is at approximately the same predetermined temperature;
    a plurality of intumescent material sheets that are flame-activated to redirect flames during a thermal event away from the battery modules and high voltage connections;
    a tray having the plurality of modules disposed therein, wherein the female coolant input port of a first half module couples to the male coolant input port of a second half module such that input coolant that flows into the second half module also flows through the male coolant input and female coolant input ports of the first half module along a linear flow path parallel to an x-axis, the x-axis parallel to cylinder axes of the cylindrical rechargeable battery cells; and
    a coolant system for circulating liquid coolant flowing into the tray across the plurality of modules in parallel such that each of the modules is at approximately the predetermined temperature.

2. The energy-storage system of claim 1, wherein the coolant system creates a pressure gradient for coolant flowing into and out of each module of the plurality of modules disposed in the tray, the pressure gradient providing circulation of the coolant so as to minimize a temperature gradient between modules of the plurality of modules.

3. The energy-storage system of claim 1, wherein the cells are disposed between the current carrier and the plate such that an exterior side of each of the cells is not in contact with the exterior sides of other cells, the coolant sub-system circulating coolant among and between the cells to provide submerged, substantially even distributed cooling.

4. The energy-storage system of claim 1, wherein air pockets are formed using channels in a space between the current carrier and the plate that is not occupied by the cells, the air pockets comprising a fluid other than the coolant.

5. The energy-storage system of claim 4, wherein the coolant flows through each half module along a cylindrical body of a battery cell within the half module.

6. The energy-storage system of claim 1, wherein the modules are arranged in a plurality of strings, each string of the plurality of strings including a plurality of modules.

7. The energy-storage system of claim 6, wherein the coolant flows through the plurality of strings in parallel and the coolant flows within each string of the plurality of strings in parallel.

8. The energy-storage system of claim 1, wherein the coolant comprises at least one of a synthetic oil, ethylene glycol and water, and a liquid dielectric.

9. The energy-storage system of claim 1, wherein at least two adjacent modules of the plurality of modules are fluidly and electrically coupled to each other.

10. The energy-storage system of claim 1, wherein the cells are oriented and mounted horizontally in each half module.

* * * * *